Dec. 19, 1967   H. D. COBURN, JR   3,359,536
CONTROL OF MARINE SEISMIC SYSTEMS
Filed Dec. 12, 1963
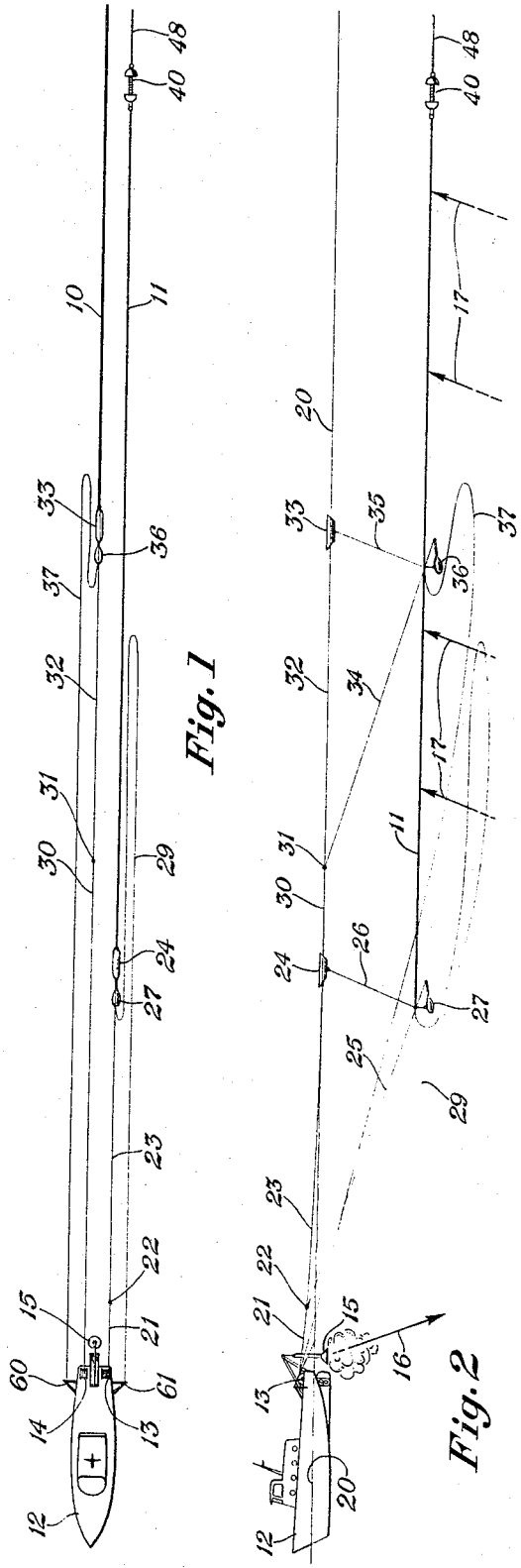
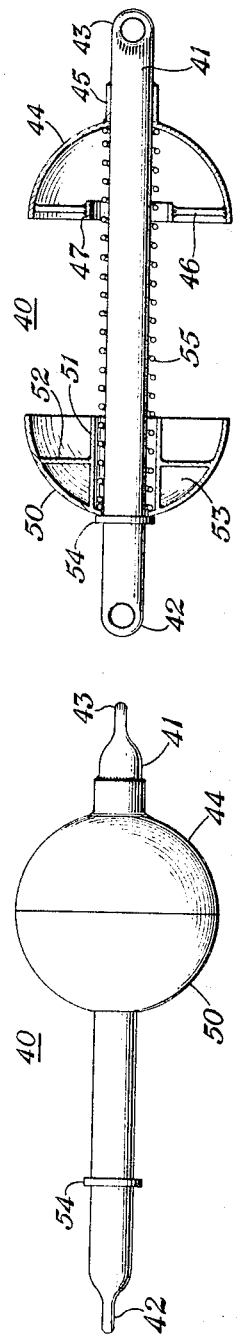
Fig.3
Fig.4
HERBERT D. COBURN, JR.
INVENTOR.
BY  D. Carl Richards
Attorney

United States Patent Office 3,359,536
Patented Dec. 19, 1967

3,359,536
CONTROL OF MARINE SEISMIC SYSTEMS
Herbert D. Coburn, Jr., Dallas, Tex., assignor to Texas Instruments Incorporated, Dallas, Tex., a corporation of Delaware
Filed Dec. 12, 1963, Ser. No. 330,115
9 Claims. (Cl. 340—7)

This invention relates to marine seismic surveying and more particularly to the control of a detecting streamer as is used in marine seismic surveying to maintain the same in a predetermined relation to a moving marine vessel and automatically to arrest travel of the streamer.

In seismic exploration over water, a cable-type detector or streamer ordinarily is utilized. The steamer is a smooth, neutrally buoyant, flexible tubing in which a plurality of seismic detectors are encased. The streamer normally is towed horizontally in the water behind a boat. The streamers in practice have been used with dimensions of the order of several hundred feet in length. They are towered at selected depths below the surface. It has been found that significant increases in the discernible range of the seismic exploration procedure can be achieved if the receiving streamer is at rest in the water during the interval that the signals reflected from subsurface interfaces are received. By maintaining the streamer fixed in position and horizontally at depth, there is eliminated travel noise that is generated by mere movement of the streamer through the water along with the boat. In order to achieve a desired volume of production of seismic data from a given ouperating unit, it is impractical to stop and start the boat at the seismic shooting rates. In order to operate while the boat is underway, a detector unit of various forms has been freed from towing forces during specified intervals so that the detectors come to rest for the duration of the interval for recording seismic signals. Such a system is shown in Flude Patent No. 2,283,200. Winch means are employed to reel in the detectors for release for the next shot impulse. A smooth detector streamer achieves a certain momentum which must be dissipated before reception of the signals.

The present invention is directed to the control of the seismic streamer for travel horizontally through the water at a selected depth and for bringing it to rest abruptly upon removal of the towing forces.

In a further aspect, the invention relates to application of towing forces and to the generation of braking forces. The streamer maintains uniform depth despite towing forces and the braking forces change in magnitude in dependence upon the towing forces. The braking forces undergo changes which are opposite in sense to changes in the towing force. That is to say, an increase in the towing force will serve to decrease the braking force at the end of the streamer.

In a more specific aspect of the invention, a bridled streamer, controlled as to depth, is provided with an automatic sea anchor. A towbar is adapted to be secured at its lead end to the trailing end of the streamer. A forward-facing cup is mounted in a fixed position on a trailing portion of the bar. A rearward-facing cup is slidably mounted on a forward portion of the bar. A compression spring encircles the bar between the cups to maintain them separated at low velocities for generation of high braking forces on the streamer. At high velocities, the spring is compressed and the cups are drawn closed so that a smooth surfaced, low drag, hydrodynamic shape is formed which provides a minimum of braking force.

For a more complete understanding of the present invention and for further objects and advantages thereof, reference may now be had to the following description taken in conjunction with the accompanying drawings in which:

FIGURE 1 is a plan view of a seismic exploring system employing two alternately operated detector streamers;

FIGURE 2 is an elevation view of the system of FIGURE 1;

FIGURE 3 is a view partially in section of an anchor in an open state; and

FIGURE 4 is a view of the sea anchor of FIGURE 3 when closed.

Referring now to FIGURES 1 and 2, a marine seismic exploring unit is illustrated in which two seismic detector streamers 10 and 11 are towed behind a boat 12 under the control of winches 13 and 14. Winches 13 and 14 operate such that streamers 10 and 11 are employed sequentially for the detection of seismic reflections from repetitive shots or pulses generated at a relatively high repetition rate. A source of seismic waves 15 is supported at the stern of the boat 12 and is periodically actuated for the generation of downwardly-directed seismic waves as represented by arrow 16. The downwardly-traveling waves penetrate the earth formations below the floor of the area being explored, with the result that at reflecting substrata interfaces, echoes of the downwardly-traveling waves are returned to the surface. The reflections impinge the streamer 11 as indicated by the arrows 17, resulting in the generation of electrical signals which may then be recorded in the form of the conventional seismogram with the return echoes being displaced along a time axis on the seismogram with reference to the instant at which the seismic pulses are produced by source 15.

In accordance with one mode of operation carried out by the system of FIGURES 1 and 2, the boat 12 is maintained on course at uniform speed. In order to provide the continuous seismic coverage of the subsurface under the traverse of the boat 12, the two detecting streamers 10 and 11 are employed alternately. They are reeled in and payed out, much as yo-yos, in synchronism with the generation of the pulses by the source 15. More particularly, and as best seen in FIGURE 2, the streamer 11 is towed behind boat 12 at a fixed depth below the water surface 20. The streamer 11 is secured to boat 12 by a bridle arrangement which includes a winch line 21 which leads to a coupling link 22. From the link 22 a float tow line 23 extends to a float 24 which rides the water surface. The link 22 is also connected by way of a cable 25 to the lead end of the streamer 11. A third cable 26 is connected between the float 24 and the lead end of the streamer 11. A weight or pig 27 is secured to the lead end of the cable to maintain the lead end of the cable at a uniform depth in the water when towing forces are applied thereto. The cable 11 as previously mentioned is preferably about neutrally buoyant. As cable 11 travels through the water, it will be maintained substantially horizontal. The winch cable 21 is threaded onto winch 13 so that it can be reeled in and payed out from the boat as desired. Electrical conductors leading from the detectors in streamer 11 are connected to the boat 12 by way of a cable 29. The cable 29 is provided with sufficient slack that the streamer may be hauled in and payed out without reeling in and paying out the electrical cable 29.

The streamer 10 similarly is controlled by way of a winch cable 30 which leads from the winch 14 to a link 31. From the link 31 is a float tow cable 32 extends to a float 33. A second cable 34 is connected to the lead end of the streamer 10. A third cable 35 couples the float 33 to the lead end of the cable 10 to control the depth. A weight or pig 36 is connected to the lead end of streamer 10 to assist in maintaining the depth uniform. Electrical cable 37 provides a circuit from cable 10 to instrumentation on boat 12.

In FIGURE 1 it will be seen that the cable 11 is reeled in close to the boat 12 whereas the cable 10 is at rest and is a substantial distance behind the boat. In operation, at about the time a seismic impulse is produced by source 15, the towing force from the winch 13 is removed from the streamer 11 so that it may come to rest in the water to receive reflections of the pulse produced by source 15. During the interval that the streamer 11 is at rest, the winch 14 is energized to reel in the tow cable leading to the streamer 10. At about the instant that the source 15 generates a second pulse, the streamer 10 is close to the boat and is released to receive seismic reflections from the second pulse. Suitable control circuits are provided in the boat 12 alternately to couple the circuits of cables 29 and 37 to recording instruments and to record the instant at which each of the shots are generated by the source 15.

It has been found highly desirable and necessary for most efficient operation to make certain that the streamer in use be maintained at rest during the recording interval. In operation the source 15 is actuated about every five seconds so that a relatively tight schedule is maintained in the alternate reeling in of the streamers 10 and 11. This means that in order to provide for a quiet stationary streamer during each recording interval, the streamer must be subject to abrupt braking action and brought to rest almost immediately when the towing force is removed.

Further, the streamer preferably will follow a horizontal course through the water when subject to towing forces.

In accordance with the present invention, towing and braking forces are applied so as to maintain the desired relationship without placing undue strain on the relatively delicate streamer structure. Braking forces are applied by an automatic sea anchor. More particularly, as illustrated in FIGURES 1 and 2, a sea anchor 40 is secured on the trailing end of the streamer 11. A similar anchor, not shown, is secured to the trailing end of the streamer 10. One embodiment of the anchor of this invention is of the construction illustrated in FIGURES 3 and 4. The anchor of FIGURE 3 is shown in an expanded condition. The anchor includes a central bar 41 preferably hollow and water-tight. An eyelet 42 in the lead end is to be connected to the trailing end of the streamer 11 and an eyelet 43 in the trailing end is adapted to be connected to a slightly buoyant painter line. In FIGURES 1 and 2, a painter 48 is illustrated as connected to the trailing end of the sea anchor 40.

A hollow, forward-facing cup 44 of hemispherical form is secured at a central stem 45 to the bar 41 and is fixed in its relationship with respect to the bar by any suitable means such as by welding or clamping. A spider structure 46 is anchored near the mouth of the cup 44 and includes a plurality of radial bars welded at their ends to the inner wall of the cup 44 and to a central ring 47 which encircles the bar 41. A rearwardly-facing cup 50 of hemispherical form is slidably mounted on the bar 41. The cup 50 includes a central tubular member 51 which encircles the bar 41. A disk 52 is welded inside the cup 50 to provide an air-tight compartment 53. Preferably, the anchor 40 is neutrally buoyant.

Normally the cup 50 is maintained near the forward end of the rod 41 and in abutting relation with an annular stop 54 by a spring 55 which encircles the bar 41. The spring is an elongated helical compression spring, one end of which engages the inner wall of the cup 50 and the trailing end of which engages the inner wall of the cup 44. Tubular member 41 preferably is graphite coated to provide a low-friction surface for cup 50 and spring 55 to run on. Sintered Teflon coatings also may be used.

The spring 55 has physical characteristics such that under normal towing forces applied by winch 13 when the streamer 11 is being reeled in, the spring will be compressed so that the cup 50 will be moved into an abutting relation with the lip of the cup 44 and will assume the orientation illustrated in FIGURE 4. Thus, when towing forces are applied, the sea anchor is in the form of a smooth-walled sphere which presents a minimum of drag at the trailing end of the streamer. This reduces the towline tension forces which otherwise would tear some streamers in half. This device effects a minimum of drag during winching to prevent cable and streamer separation due to high towing tensions. However, the instant that the towing force is released by disengaging the winch 13 and permitting the cable 21 to be payed out, the spring 55 forces the cups 50 and 44 apart so that there is an immediate application of a braking force by the sea anchor 40. It will be apparent that the braking force is a function of spring rate and towing velocity. The spring 55 must be such that it has a spring rate that will provide the required braking performance commensurate with ship speed, firing times, and streamer acceleration curves.

The towing forces are applied to the streamers 10 and 11 by way of bridle arrangements. In one embodiment, the bridle for streamer 11 comprised lines 23, 25 and 26 to maintain the streamer 11 at a depth of about thirty (30) feet. The depth was maintained during towing operations by the utilization of float 24 and a diving pig 27. The float 24 as well as the pig 27 and the automatic anchors 40 may be varied in size and in the points of coupling thereto, depending upon the speed at which the operation is to be conducted. In a typical operation where a vessel speed of about four (4) miles per hour was maintained, the float 24 was formed of 16 ga. steel pipe ten (10) inches in diameter and was five (5) feet in length. The leading face was beveled at an angle of 30° and welded closed by an oval plate. Onto the oval plate, there was welded a flat iron bar extending along the long axis of the oval with the bar perpendicular to the face of the plate and having a plurality of holes therethrough for attachment of cable 23. A similar bar was welded along the length of the lower side of the float for attachment of cable 26. The trailing edge of the float was beveled at 45° with an oval plate welded therein to form a water-tight enclosure.

The angle between cables 25 and 26 was maintained approximately 90°. The pig 27 preferably is of tear-drop shape and made of solid iron. In one embodiment the maximum diameter was about six (6) inches and the length was about twelve (12) inches. A cylindrical tail section was formed of a rod of about one and three-eighths (1⅜) inches in diameter and sixteen (16) inches in length. The pig 27 was suspended below the nose of the streamer 11 slightly tilted downward. The angle of tilt and the points of attachment of the cables to the float 24 were adjusted by trial and error for the selected operating system so that upon the abrupt application of towing forces following a given recording interval, the float 24 would not dive nor would the nose of the streamer 11 rise toward the surface. By this means, the forces were balanced such that the streamer would follow a course of uniform depth through the water.

The use of such a structure permits the boat to carry out its intended operations with a minimum change in the progress of the boat along its selected course, while at the same time causing the streamer 11 to be abruptly halted in its movement through the water by the application of the high braking forces. The automatic anchor 40 generates braking forces which, in general, change in sense inversely with respect to changes in the towing forces.

In one embodiment the central bar 41 was three (3) feet in length and one and three-eighth (1⅜) inches in diameter. It was formed of aluminum tubing of 0.058 inch wall thickness. The cups 44 and 50 were six (6) inches in diameter. The spring 55 was formed of about fifty (50) turns of spring stock of 0.095 inch in diameter. The coil was of 1.405 inches minimum inside diameter. With the cups 44 and 50 compressed together as in FIGURE 4, the spring length was compressed from twenty-four (24) inches to six (6) inches under a load of from ten (10) to twelve (12) pounds.

The source 15 may be of the type generically represented by Patent No. 3,055,450 in which mixtures of oxygen and propane are repeatedly detonated in a chamber open at the bottom. Various configurations of such source systems are known in the art for production of seismic impulses in various energy ranges. The above patent is cited as an indication of the type of unit to be employed in the system of FIGURES 1 and 2. While the source 15 is shown at a pairly shallow depth, in practice the source was towed behind boat 12 at the same depth as the streamers. The ignition system, including spark plug 108, is suitably housed as to be maintained moisture-free.

Streamers 10 and 11, of the type manufactured and sold by Seismic Engineering Company, Dallas, Tex., and identified as Marine Seismic Cable Type 20–S, have been found to be satisfactory. Such streamers include twenty (20) spaced detectors connected to a single information channel leading to boat 12. The construction may be of the type generally disclosed in Patent No. 2,465,696 to Paslay.

While for the sake of clarity in FIGURE 2, the lead-in cables 29 and 37 have been illustrated as looping downward below the streamers 10 and 11, the cables ordinarily are of the floating type and would rise toward the surface. As indicated in FIGURE 1, the lead-in cables 29 and 37 are towed from side booms 60 and 61 so that they trail behind the boat 12 free and clear of the path of the streamers 10 and 11 and their control bridles.

Thus, in accordance with the invention, there is provided a control system for an elongated seismic detecting streamer employed in marine operations. A bridle is connected to the lead end of the streamer and includes a first link extending vertically upward and a second link extending forward and upward. A high density body, preferably of tear-drop shape with an elongated tail, is supported from the lead end of the streamer. A hollow, elongated float cylinder having sloping forward and trailing ends is connected to the first link as a point along the lower sector of the float body. A third link extends from a point along the axis of the sloping front end to connect to the second link for application of towing forces. Finally, an automatic sea anchor is connected to the trailing end of the streamer and has members resiliently forced apart to produce a high drag force when the towing force is low, and to produce a relatively low drag force when the towing force is high.

While the invention has been described in connection with specific embodiments, it is to be understood that modifications may be made in the system without departing from the spirit and scope of the appended claims. Also, it is to be understood that the apparatus of the present invention is not limited in its use to marine seismic exploration, but has other uses such as in submarine detection apparatus and other marine seismic devices.

What is claimed is:

1. An anchor means for a seismic streamer which comprises:
    (a) a bar adapted to be secured at a lead end thereof to the trailing end of said streamer,
    (b) a forward-facing cup mounted in fixed position on the trailing portion of said bar,
    (c) a rearward-facing cup of a diameter essentially equal to the diameter of said forward facing cup slidably mounted on the forward portion of said bar, and
    (d) a compression spring encircling said bar between the cups to maintain them separated at low velocities to generate high braking forces on said streamer and to permit said cups to close to a smooth surface with minimum braking forces at high velocities.

2. In a marine seismic exploring system, the combination which comprises:
    (a) a smooth-walled tubular detecting streamer having a lead end and a trailing end,
    (b) a rigid, hollow tube connected at its lead end to the trailing end of said streamer,
    (c) a rigid, forward-facing open cup secured near the trailing end of said tube,
    (d) a rearward-facing cup of a diameter essentially equal to the diameter of said forward facing cup slidably mounted on said tube ahead of said forward-facing cup, and
    (e) a helical compression spring encircling said tube normally to maintain the cups spaced apart while permitting said cups to be brought into closed confronting relation upon the application of high towing forces to said lead end of said streamer.

3. In a marine seismic exploring system, the combination which comprises:
    (a) a smooth-walled tubular detecting streamer having a lead end and a trailing end,
    (b) a rigid, hollow tube connected at its lead end to the trailing end of said streamer,
    (c) a rigid, forward-facing open hemisphere secured near the trailing end of said tube,
    (d) a rearward-facing hemisphere of a diameter essentially equal to the diameter of said forward facing hemisphere slidably mounted on said tube ahead of said forward-facing hemisphere, and
    (e) a helical compression spring encircling said tube normally to maintain the hemispheres spaced apart while permitting them to be brought into closed confronting relation upon the application of high towing forces to said lead end of said streamer.

4. A control system for an elongated, tubular detecting streamer employed in marine exploration which comprises:
    (a) a bridle connected to the lead end of said streamer including a first link extending substantially vertically upwardly and a second link extending forwardly and upwardly,
    (b) a solid, high density body of tear-drop shape having length-to-maximum diameter in a ratio of the order of about three, with an elongated tail extending axially and rearwardly of said body,
    (c) supporting links depending from said lead end to support said body,
    (d) a hollow, elongated float cylinder having a forward end closed by a forward, upwardly sloping oval plate and a rear end closed by a rearward, upwardly sloping oval plate,
    (e) means for connecting said first link to a selected point along the length of the lower sector of said float cylinder to support said streamer and said body,
    (f) a third link extending from a selected point along the major axis of said forward oval plate,
    (g) means coupled to said third link and to said second link for applying towing forces to said float cylinder and to said streamer, and
    (h) an automatic sea anchor connected to the trailing end of said streamer having two members resiliently forced apart to produce high drag forces when said towing forces are low and automatically forced together when said towing forces exceed a predetermined level to minimize the drag forces on said streamer when subject to high towing forces.

5. A control system for an elongated, tubular detecting streamer employed in marine exploration which comprises:
    (a) a bridle connected to the lead end of said streamer including a first link extending substantially vertically upwardly and a second link extending forwardly and upwardly,
    (b) a solid, high density body of tear-drop shape having length-to-maximum diameter in a ratio of the order of about three, with an elongated tail extending axially and rearwardly of said body,
    (c) supporting links depending from said lead end to two forward, laterally spaced points on the upper one-half of said body and to a third point at the trailing portion of said tail with said tail normally elevated higher than said body,
    (d) a hollow, elongated float cylinder having a forward end closed by a forward, upwardly sloping oval plate and a rear end closed by a rearward, upwardly sloping oval plate,
(e) means for connecting said first link to a selected point along the length of the lower sector of said float cylinder to support said streamer and said body,
(f) a third link extending from a selected point along the major axis of said forward oval plate,
(g) means coupled to said third link and to said second link for applying towing forces to said float cylinder and to said streamer, and
(h) an automatic sea anchor connected to the trailing end of said streamer having juxtaposed hemispheres of essentially equal diameters resiliently forced apart to produce high drag forces when said towing forces are low and automatically forced together when said towing forces exceed a predetermined level to minimize the drag forces on said streamer when subject to high towing forces.

6. A control system for an elongated, tubular detecting streamer employed in marine exploration which comprises:
(a) a bridle connected to the lead end of said streamer including a first link extending substantially vertically upwardly and a second link extending forwardly and upwardly,
(b) a weight connected to said lead end,
(c) a float connected to said first link,
(d) a third link connected between said float and the forward end of said second link for application of towing forces to said streamer,
(e) a multi-conductor cable connected at one end into said lead end of said streamer and extending with slack therein forwardly and upwardly past the region of the juncture of said third link and said second link, and
(f) anchor means at the trailing end of said streamer responsive to application and removal of said towing forces to produce drag forces which inversely vary in magnitude with respect to the magnitude of said towing forces.

7. A depth control pig for a marine sesimic streamer which comprises:
(a) a solid, high density body of tear-drop shape having length-to-maximum diameter in the ratio of the order of about three,
(b) an elongated rigid tail extending axially and rearwardly of said body, and
(c) three links connected at the upper ends thereof to the front of said streamer and to said pig at two forward, laterally spaced points on the upper half of said body and at a third point on the trailing portion of said tail with said tail elevated above said body.

8. In a marine exploring system the combination which comprises:
(a) a tubular detecting streamer,
(b) a bridle connected to said lead end including an upwardly extending link and a forwardly extending link for application of towing forces to said streamer,
(c) a solid, high density body of tear-drop shape having length-to-maximum diameter in the ratio of the order of about three,
(d) an elongated rigid tail extending aixally and rearwardly of said body, and
(e) supporting links depending from said lead end to two forward, laterally spaced points on the upper half of said body and to a third point at the trailing portion of said tail.

9. In a seismic exploration system, the combination which comprises:
(a) a marine vessel,
(b) a seismic detector streamer,
(c) which means including a towing cable connected to the forward end of said streamer and a conductor cable connected to said vessel laterally of said winch means and to the front of said streamer with a loop of length to accommodate movement of said streamer relative to said vessel under control of said winch means, and
(d) anchor means at the end of said streamer opposite said vessel responsive to towing forces on said streamer to produce drag forces which inversely vary in magnitude with respect to the magnitude of said towing forces to cause said loop to vary in length.

References Cited

UNITED STATES PATENTS

| | | | |
|---|---|---|---|
| 727,175 | 5/1903 | Miller | 114—209 |
| 2,287,257 | 6/1942 | Lear | 114—209 X |
| 2,791,757 | 5/1957 | Blake et al. | 340—7 |
| 2,465,696 | 3/1949 | Paslay | 181—.5 |
| 3,281,767 | 10/1966 | Cryar | 340—7 |

BENJAMIN A. BORCHELT, *Primary Examiner.*

P. A. SHANLEY, *Assistant Examiner.*